Dec. 1, 1925.

D. C. KERCKHOFF ET AL 1,563,904

FILTER

Filed Nov. 19, 1923

Inventors:
Daniel C. Kerckhoff,
Ralph Copp,
By Hugh K. Wagner
Attorney.

Patented Dec. 1, 1925.

1,563,904

UNITED STATES PATENT OFFICE.

DANIEL C. KERCKHOFF AND RALPH COPP, OF ST. LOUIS, MISSOURI, ASSIGNORS TO PEVELY DAIRY COMPANY, OF ST. LOUIS, MISSOURI, A CORPORATION OF MISSOURI.

FILTER.

Application filed November 19, 1923. Serial No. 675,628.

*To all whom it may concern:*

Be it known that we, DANIEL C. KERCKHOFF and RALPH COPP, citizens of the United States, residing at the city of St. Louis, in the State of Missouri, have invented certain new and useful Improvements in Filters, of which the following is a specification.

This invention relates to filters, and pertains more particularly to a device for filtering milk and the like.

The principal object of the present invention is to prolong the useful life of the filtering cloth used in filters of this type.

Another object is to provide means whereby the milk is filtered through cloth in successive stages, a coarse used cloth being used in the initial stages, and a new cloth in a later stage.

Another object is to minimize the foaming, bubbling, splashing and the like incident to the usual manner of feeding the milk to the filter, and thereby to effect a reduction in the bacteria content.

Another object is to provide a novel means of keeping the partitions, which are made removable, within proper bounds.

Other objects and advantages will be apparent as the description proceeds.

Figure 1:
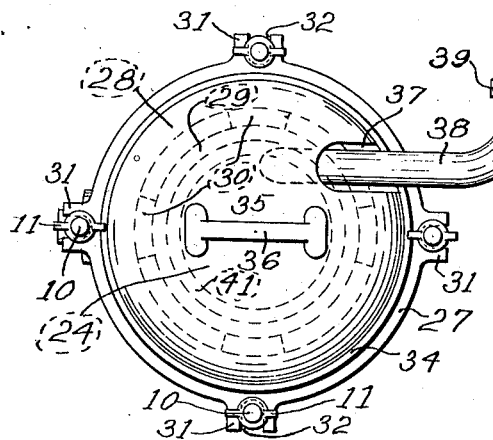
Figure 2:
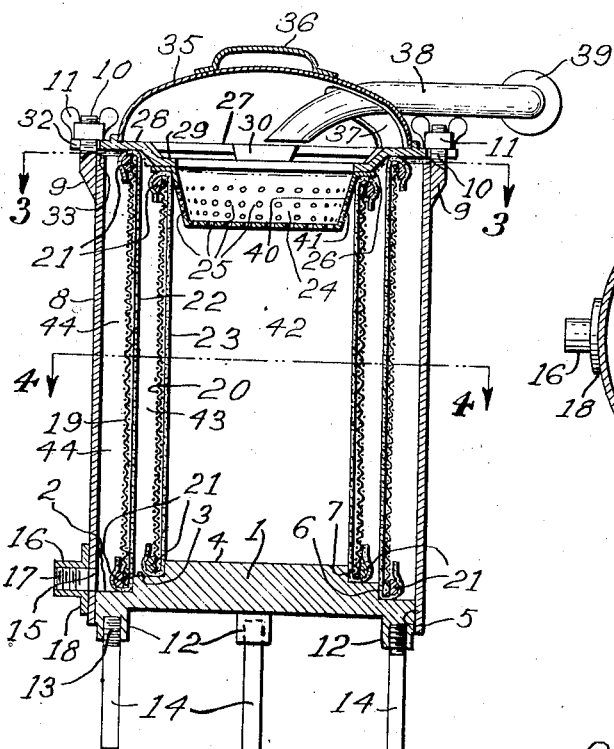

In the accompanying drawings forming part of this specification, in which like numbers of reference denote like parts wherever they occur, Figure 1 is a plan view of the filter;

Figure 2 is a longitudinal central sectional view through the same; and

Figure 3:
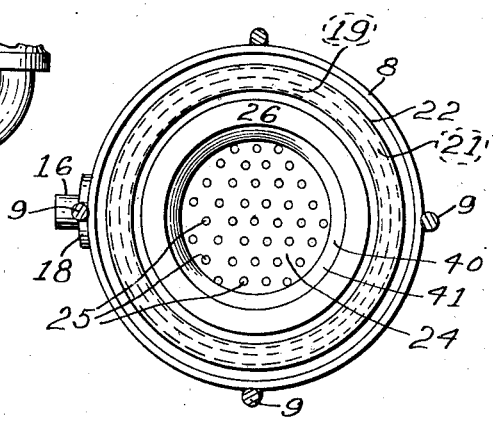
Figure 4:
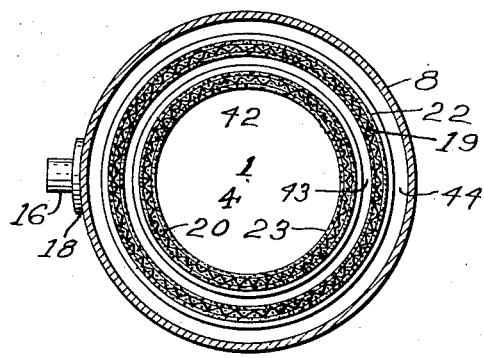

Figures 3 and 4 are transverse sectional views taken on the lines 3—3 and 4—4 respectively of Figure 2.

A base 1, preferably of tinned brass, has a series of peripheral steps 2, 3, and 4, preferably annular in shape, and terminated by sides 5, 6, and 7. An inclosing side wall 8 of impervious material, such as tinned copper, is secured to the side 5, preferably by soldering, and has secured thereto at its top, also, preferably by soldering, a number of stems 9, externally threaded at 10 for the reception of wingnuts 11. Bosses 12 on the bottom of the base 1 are internally threaded at 13 to receive the externally threaded supporting standards 14. An opening 15 in wall 8 has its bottom in alinement with step 2, and a sleeve 16, internally threaded at 17 to fit an outlet pipe, is secured, with its passage in alinement with opening 15, by soldering its flange 18 to the outside of the wall 8.

A drum 19, of wire screening, rests on step 2, and a drum 20, also, of wire screening, rests on step 3. The drums 19 and 20 have outside reinforcing rings 21 at their upper and lower ends. The rings 21 provide a smooth turning surface for the filtering cloths 22 and 23, which line the inside of the screens 19 and 20 and are held thereon by turning over their upper and lower ends on the rings 21. The drums 19 and 20 are preferably of such diameter that the cloths 22 and 23 abut against the sides 6 and 7 respectively of the base 1. Cloth 22 is new cloth, and cloth 23 is cloth which has been in previous use on screen 19 and has then been washed and placed on screen 20.

A pan 24, preferably of tinned copper and having perforations 25, rests with its flange 26 on drum 20.

A clamping plate 27 compresses rings 28 and 29, which are adapted to rest on screen 19 and flange 26, respectively. The rings 28 and 29 are held integral by webs 30. Plate 27 has a number of lugs 31, having slots 32, which are arranged to register with the threaded stems 9. Wingnuts 11, bearing on the lugs 31, clamp plate 27 with its rings 28 and 29 bearing on the drum 19 and pan 24 respectively, and thereby positively holding the drums 19 and 20 and pan 24 in their respective positions. Plate 27 does not bear on the upper end 33 of wall 8, so that the entire clamping strain is exerted through the screens 19 and 20 to steps 2 and 3 of base 1. Plate 27 has an annular rib 34, which keeps a removable cover 35 within proper bounds.

Cover 35 is provided with a handle 36 and, also, contains a slot 37 for the passage of a feed pipe 38.

Feed pipe 38 can be swung on its joint 39, after the removal of the cover 35, and thereby provide clearance for the withdrawal of screens 19 and 20 and pan 24, when desired, after removing plate 27. Feed pipe 38 is directed to throw the stream of milk tangentially against the inside 40 of wall 41 of pan 24. This smooth tangential flow mitigates splashing, foaming, and bubbling, and thereby contributes to a reduction in the bacterial increment normally resulting from such violent agitation in the presence of air.

The milk passes through the perforations 25 in pan 24, leaving the coarser particles of foreign matter in the pan 24, while the finer particles pass with the milk into the central compartment 42 below. From compartment 42, the milk filters through cloth 23, the particles of intermediate coarseness being retained in compartment 42, while the finest foreign particles pass with the milk through the cloth 23 into intermediate annular compartment 43, where they are retained because unable to filter with the milk through the fine pores of the new cloth 22 into the outer compartment 44, from which the filtered milk passes into the outlet pipe through opening 15.

Where a single filtering cloth is used in a filter of this type, it rapidly becomes clogged with impurities, and must then be discarded, any washing of the same being precluded by reason of the fact that such washing enlarges the pores and thereby renders the cloth unfit for further use when employed alone in a filter. However, when, as contemplated in this invention, two screens are employed, the new cloth being used in the later stage of filtering, and the washed cloth in the earlier stage, then the washed cloth serves a new and useful purpose, by filtering the coarser impurities and allowing only the finer ultimate particles to be filtered by the new cloth. The new cloth, therefore, does not become clogged so readily, and, when finally washing does become necessary, the cloth need not be discarded, but can then be used for filtering the coarser particles.

Having thus described this invention, we hereby reserve the benefit of all changes in form, arrangement, order, or use of parts, as it is evident that many minor changes may be made therein without departing from the spirit of this invention or the scope of the following claims.

We claim:

1. A filter including an open topped cylindrical casing having a bottom provided interiorly with a series of concentric steps, cylindrical filtering screens graduated in height and resting on respective steps, a pan shaped strainer fitting within the inner screen at its top and having a peripheral flange resting on the top edge of said inner screen, a removable cover for said casing having a central opening and being concentrically stepped, the inner step of the cover engaging said flange to force it against the top edge of the inner strainer, the outer step of the cover engaging the top edge of the outer strainer, and means to secure said cover on said casing removably.

2. A filter including an open topped cylindrical casing having a bottom provided interiorly with a series of concentric steps, cylindrical filtering screens graduated in height and resting on respective steps, a pan shaped strainer fitting within the inner screen at its top and having a peripheral flange resting on the top edge of said inner screen, a removable cover for said casing having a central opening and being concentrically stepped, the inner step of the cover engaging said flange to force it against the top edge of the inner strainer, the outer step of the cover engaging the top edge of the outer strainer, and means to secure said cover on said casing removably, said cover having its steps connected by circumferentially spaced radial portions whereby arcuate slits are provided between the steps communicating with the space between the screens.

3. A filter including an open topped cylindrical casing having a bottom provided interiorly with a series of concentric steps, cylindrical filtering screens graduated in height and resting on respective steps, a pan shaped strainer fitting within the inner screen at its top and having a peripheral flange resting on the top edge of said inner screen, a removable cover for said casing having a central opening and being concentrically stepped, the inner step of the cover engaging said flange to force it against the top edge of the inner strainer, the outer step of the cover engaging the top edge of the outer strainer, means to secure said cover on said casing removably, an annular rib projecting upward from the cover, a hood having a slot in one side and seated on the cover to fit against said rib, and a supply pipe extending into said hood through the slot.

4. A filter including an open topped cylindrical casing having a bottom provided interiorly with a series of concentric steps, cylindrical filtering screens graduated in height and resting on respective steps, a pan shaped strainer fitting within the inner screen at its top and having a peripheral flange resting on the top edge of said inner screen, a removable cover for said casing having a central opening and being concentrically stepped, the inner step of the cover engaging said flange to force it against the top edge of the inner strainer, the outer step of the cover engaging the top edge of the outer strainer, means to secure said cover on said casing removably, an annular rib projecting upward from the cover, a hood having a slot in one side and seated on the cover to fit against said rib, and a supply pipe extending into said hood through the slot.

In testimony whereof we hereunto affix our signatures.

DANIEL C. KERCKHOFF.
RALPH COPP.